G. HARLAN.

Corn-Planter.

No. { 1,223, 32,227. }

Patented Apr. 30, 1861.

Witnesses:

Inventor:

UNITED STATES PATENT OFFICE.

GEORGE HARLAN, OF BROWNSVILLE, INDIANA.

IMPROVEMENT IN SEEDING-MACHINES.

Specification forming part of Letters Patent No. 32,227, dated April 30, 1861.

*To all whom it may concern:*

Be it known that I, GEORGE HARLAN, of Brownsville, in the county of Union and State of Indiana, have invented a new and Improved Seeding-Machine; and I do hereby declare that the following is a full, clear, and exact description of the same, reference being had to the annexed drawings, making a part of this specification, in which—

Figure 1:
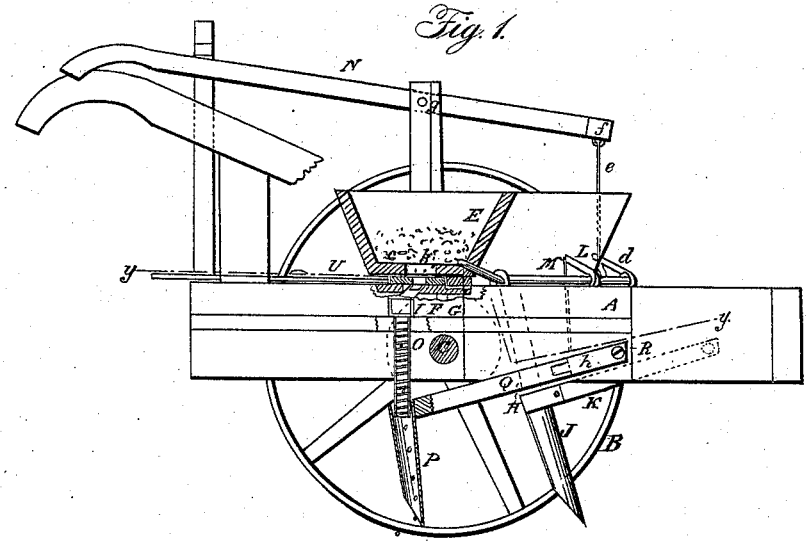
Figure 2:
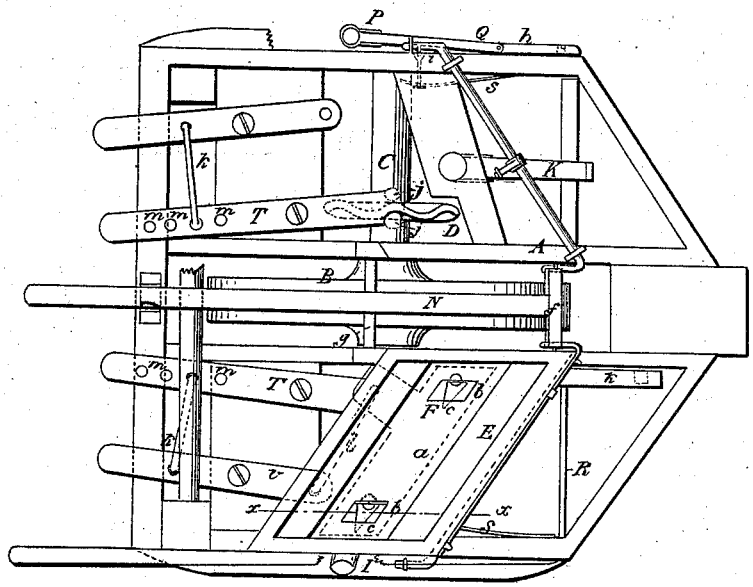

Figure 1 is a side sectional view of my invention, taken in the line $x\,x$, Fig. 2; Fig. 2, a sectional plan view of the same, taken in the line $y\,y$, Fig. 1.

Similar letters of reference indicate corresponding parts in the two figures.

The object of this invention is to obtain a seeding-machine for drilling or sowing more perfectly than hitherto wheat or other grain or seeds among standing maize or Indian corn—a system of cultivation quite generally practiced in the western States of the Union. In sowing seed in this way no machine, so far as I am aware, has ever been devised by which the seed could be sown or planted in the spaces between the hills in the rows, which are parallel with the line of draft of the machine, and consequently the ground has not hitherto been perfectly or fully planted. To obviate this difficulty I employ seed tubes or spouts so arranged or applied to the machine that a lateral self-adjusting movement is allowed them and the seed sown in the spaces above mentioned.

The invention has, further, for its object the graduating, as may be desired, of the amount of seed to be sown over a given area; and to this end levers and cams are employed, and arranged as hereinafter described.

To enable those skilled in the art to fully understand and construct my invention, I will proceed to describe it.

A represents a frame, which is mounted on a single wheel, B, said wheel being at the center of the frame and permanently attached to its axle C, on which two cams, D D, are placed, said cams being formed of circular plates having serpentine or zigzag peripheries, as shown clearly in Fig. 2.

On the frame A there are placed two hoppers, E E, which have an oblique position, their inner ends being nearer the front end of frame A than their outer ends. The bottom $a$ of each hopper E has two openings, $b\,b$, made in it, and underneath each bottom $a$ there is a slide, F, which is also perforated, as shown at $c$, and has a close bottom, G, underneath it, to which tubes H I are attached. The tubes H extend forward in an inclined position, and their lower ends are over tubes J, which are secured to the back ends of arms or bars K, the front ends of which are fitted loosely on shafts or pivoted to the frame A, so as to admit of the back ends of the bars K and tubes J being raised or lowered, as may be required. The arms or bars K are raised by means of arms L, attached to shafts M, which are placed on the frame A, the inner ends of the shafts M being bent in crank form, as shown at $d$, and connected by rods $e\,e$ to a cross-bar, $f$, at the front end of a lever, N, which has its fulcrum at $g$. By actuating lever N, depressing its back end, the tubes J may be raised. The lower ends of the tubes I are directly over pliable tubes O, which extend down from each side of frame A, and are placed in the upper ends of tubes P, which tubes P are attached to the back ends of arms Q, the latter being fitted at their front ends on the ends of a shaft, R, placed transversely in the frame A. The arms Q are allowed to work freely on the ends of shaft R, and each arm Q is provided with a joint, $h$, which admits of the back parts of the arms and tubes P moving laterally, and to the back part of each arm Q a spring, S, is connected by a rod, $i$. These springs may be simply metal strips or bars attached to the frame A. The springs have a tendency to keep the tubes P out from the frame to their fullest extent.

The cams D D have their edges fitted between pendants $j$, at the under sides of levers T T, which are placed on the frame A, and are connected at their back parts by links $k\,k$ to levers U U, the front ends of which are connected by links $l\,l$ to slides F. (See Fig. 2.)

From the above description it will be seen that as the machine is drawn along a reciprocating motion will be given the slides F from the axle C through the medium of the cams D and levers T U, and seed distributed from the hoppers E E into the tubes H I, the seed passing from thence into the tubes J P, which conduct it into the earth, the lower ends of said tubes making the furrows. The amount of seed distributed from the hoppers may be regulated by adjusting the links $k\,k$, which connect the levers T U nearer to or farther from the fulcra of levers T, a series of holes, $m$, being made in the levers T to admit of such adjustment, and thereby increase or decrease the length of vibration of the slides F and a consequent greater or less expanse or opening of the orifices of the tubes H I. As the machine passes along, the tubes P will pass in between the hills in the rows, owing to the lateral movement allowed them, the springs S effecting this result, and the tubes are forced laterally inward or toward the sides of the frame as they approach the hills, in consequence of the resistance offered to the forward movement of the tubes, said resistance being due to the height of the hills and their curved or conical form, which deflect the tubes inward. To insure this action of the tubes the springs S are so arranged or adjusted that the tubes P will not be forced laterally past the centers of the hills, but extend within a trifle of the centers of the same.

I do not claim the reciprocating slides F, for they have been previously used; nor do I claim the cams D D, they also having been used; but I do claim as new and desire to secure by Letters Patent—

1. The tubes P, attached to bars or arms Q, jointed and provided with springs S, substantially as shown and described, to admit of a self-adjusting lateral movement of said tubes, for the purpose herein set forth.

2. The combination of the cams D, slides F, and levers T U, when the latter are connected by adjustable links $k\ k$, and all arranged as and for the purpose set forth.

GEORGE HARLAN.

Witnesses:
    JOHN A. SHORKEY,
    R. B. PERRY.